C. G. FREDRICKSON.
ENGINE PRIMER.
APPLICATION FILED APR. 1, 1919.

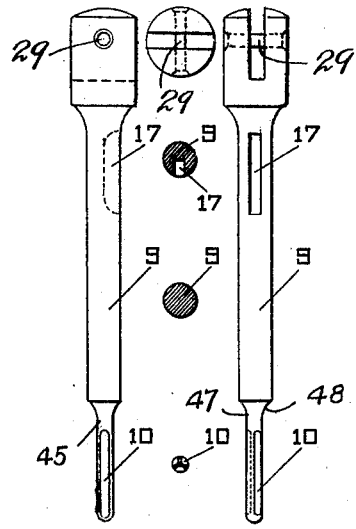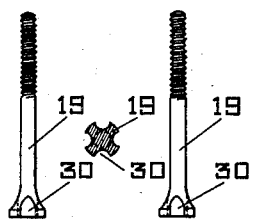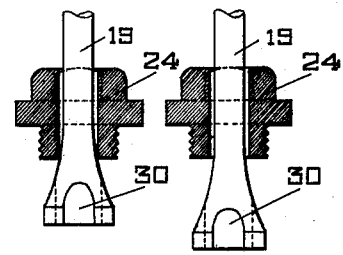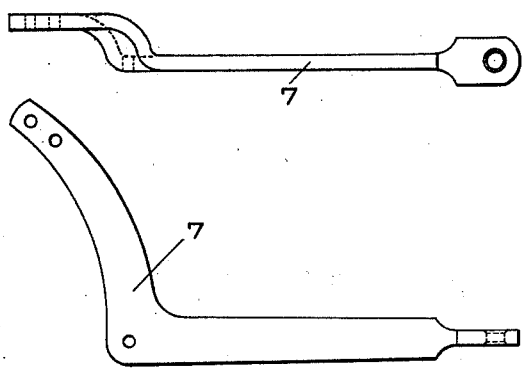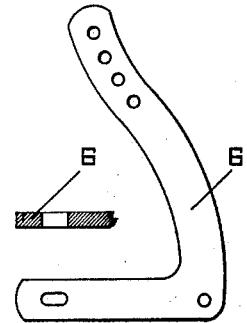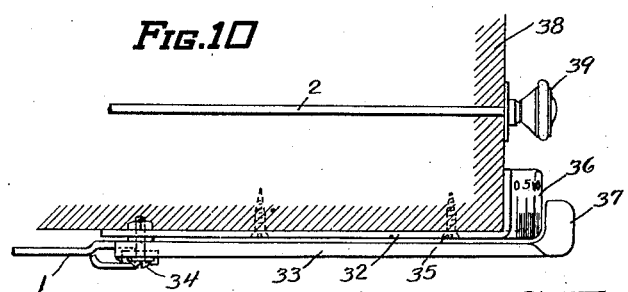

1,343,555.

Patented June 15, 1920.
5 SHEETS—SHEET 5.

INVENTOR.
C. G. Fredrickson
by H. B. Willson & Co
ATTORNEYS

UNITED STATES PATENT OFFICE.

CARL G. FREDRICKSON, OF WALTHAM, MASSACHUSETTS.

ENGINE-PRIMER.

1,343,555.  Specification of Letters Patent.  Patented June 15, 1920.

Application filed April 1, 1919. Serial No. 286,678.

*To all whom it may concern:*

Be it known that I, CARL G. FREDRICKSON, a citizen of the United States, residing at Waltham, in the county of Middlesex and State of Massachusetts, have invented certain new and useful Improvements in Engine-Primers; and I do declare the following to be a full, clear, and exact description of the invention, such as will enable others skilled in the art to which it appertains to make and use the same.

My invention has for its principal object to provide a simple and efficient device which may be used for priming automobiles and other motors to insure easy starting, novel provision being made for admitting a quantity of fresh air with the priming charge and for continuously feeding any required quantity of such fresh air to the motor while the latter is in operation.

Other objects are to provide for controlling the admission of air without operating the means which admits the priming charge, and to provide means operated by a single control for simultaneously operating both the means for injecting the priming charge and quantity of air.

With the foregoing in view, the invention resides in the novel construction and arrangement of parts hereinafter fully described and claimed, the descriptive matter being supplemented by the drawing described below.

Fig. 5 shows in elevation the priming needle.

Fig. 6 represents the air needle seat.

Fig. 7 represents the air needle.

Fig. 8 is an enlarged detail view showing the air needle in closed position.

Fig. 9 shows the air needle in open position.

Fig. 10 represents in detail the lever for operating the air needle.

Fig. 11 is a detail view of the lever for operating the priming needle.

Fig. 12 is a front elevation of a gage to be mounted on the dash of automobiles or the like.

Fig. 14 is a side elevation of the gage, and rods for operating the air and priming needles.

Figure 1:
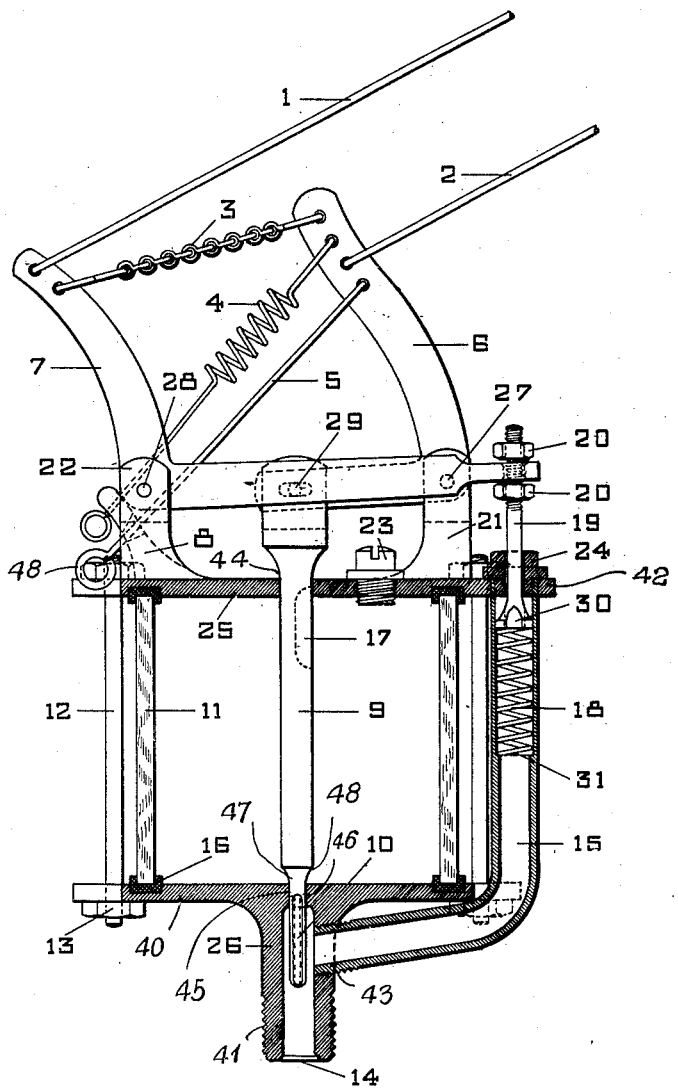
Figure 1 is a vertical section of the device showing the priming valve in closed position.
Figure 2:
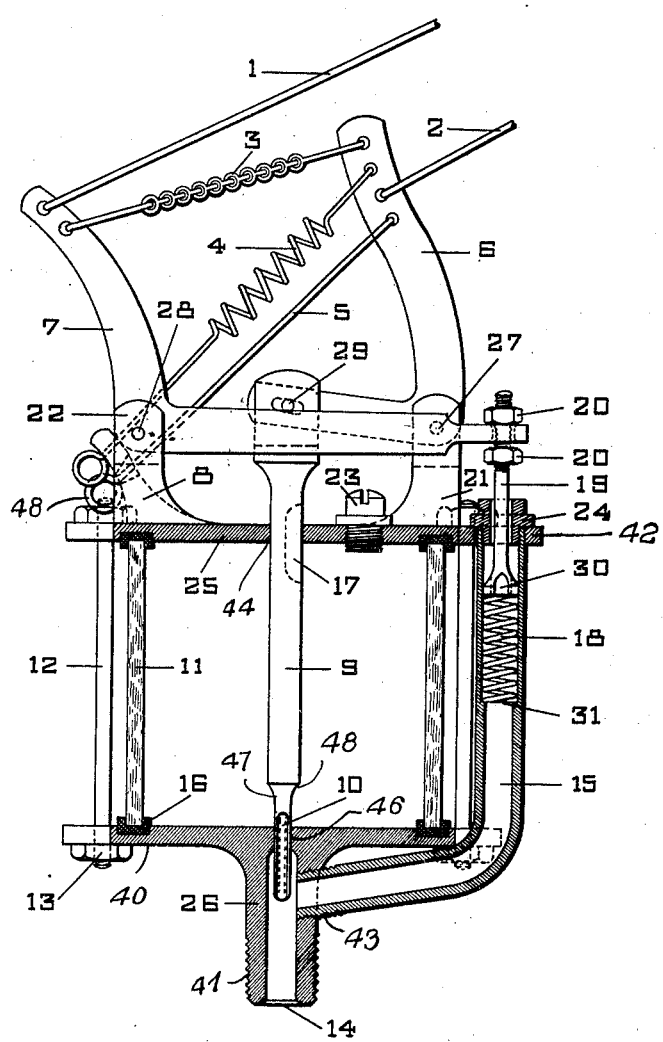
Fig. 2 is a similar view showing the valve in open position.
Figure 3:
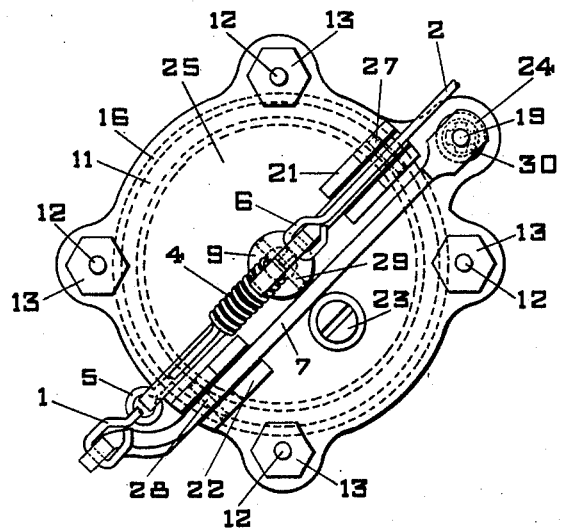
Fig. 3 is a top plan view of the device.
Figure 4:
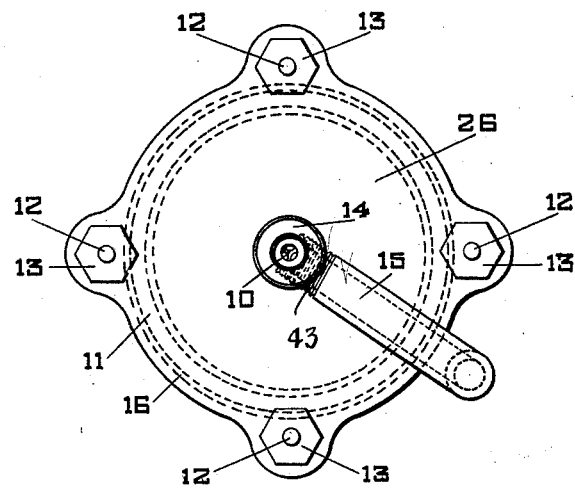
Fig. 4 is a bottom plan view thereof.
Figure 12:
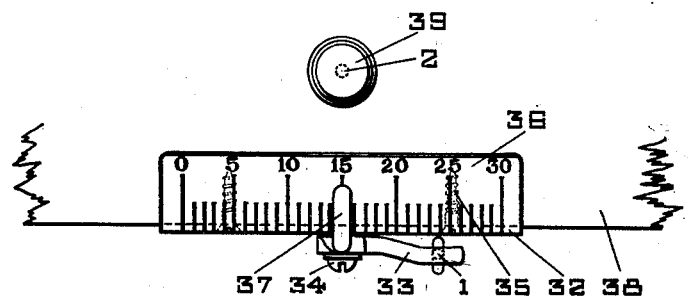
Figure 13:
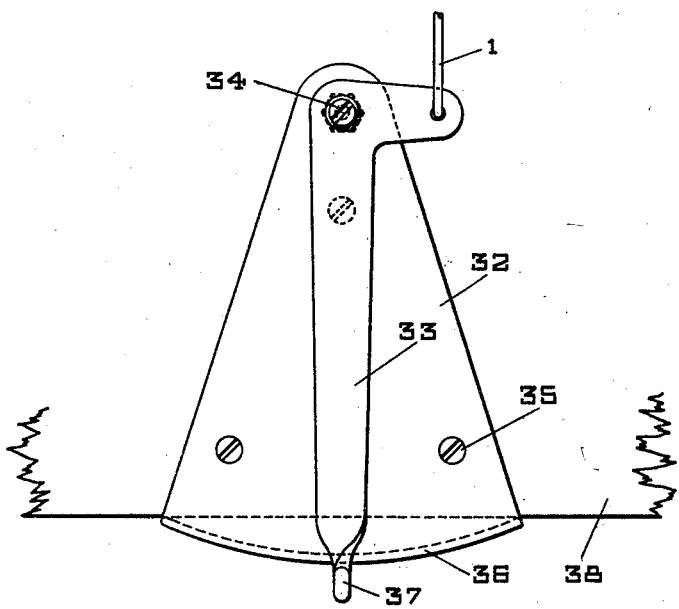
Fig. 13 is a top plan view of the gage and indicating handle.

Briefly speaking, the priming device consists of a receptacle 11 for liquid ether, alcohol, petrol, gasolene or any other suitable priming liquid, a valve 9 for controlling the discharge of the priming liquid from the receptacle 11 into the intake manifold of the motor, an air passage 15 communicating with the outlet 14 of the priming liquid, a valve 19 for controlling the admission of air, and operating means for the two valves.

The receptacle 11 is by preference constructed of a cylindrical wall of glass, a top 25, and a bottom 40, tie bolts 12 being provided to draw said top and bottom tight against gaskets 16 which are interposed between them and said wall. Preferably, though not necessarily, the top and bottom 25 and 40 are formed of brass, and said bottom is provided with an integral depending nipple 26 in which the passage 14 is formed, said nipple being threaded at 41 for tapping into the top of the intake manifold of the motor. The top 25 is provided with a lateral ear 42 having an opening receiving the upper end of the passage 15, which passage is formed by an L-shaped tube, threaded at its lower end into the side of the nipple 26 as seen at 43. The ear 42 forms an anchorage for the upper end of the tube and prevents any turning thereof which would have a tendency to loosen the threaded connection 43.

The valve 9 preferably consists of a vertical stem passing through the receptacle 11 and sliding through an opening 44 on the top thereof, the lower end of said stem being reduced to form a needle 45 sliding through the reduced entrance end 46 of the passage 14, and at the juncture of the reduced stem end 47 with the body of the stem, a conical formation 48 is provided which forms a plug to tightly close the passage end 46 when the stem is in lowered position. However, when the stem in question is raised, one or more longitudinal ports 10 with which its reduced end 45 is provided, permit a quantity of the priming liquid to run from the receptacle 11 into the intake manifold through the passage 14. At the same time, a longitudinal port 17 in the upper end of the stem moves partly above the top 25 and thus admits atmospheric air to insure the free discharge of the priming liquid.

For operating the valve 9, a bell crank lever 6 is shown, said lever being fulcrumed at 27 to a lug 21 rising from the receptacle top 25, and a pull rod or the like 2 leads from the upper end of the bell crank 6 to a point within easy reach of the driver, if the motor be provided with a self-starter, and if not this rod may well lead forwardly to be operated while cranking the motor. A spring 4 is shown connected with the bell crank 6 for normally holding it in such position as to close the valve 9, and the spring may well be anchored to a lug 8 on the receptacle top 25. Also, a stop rod 5 is preferably pivoted to the bell crank 6 and slides through the lug 8, being provided with a head 48 to strike said lug and thus limit the opening of the valve so that the ports 10 and 17 will be properly positioned.

At the upper end of the tube 15, I have shown a gland 24 whose lower end forms a valve seat for coöperation with the valve 19 and the latter is preferably of cone-shape, being provided with an upstanding stem by means of which it may be moved downwardly to open position against the tension of the spring 18 which normally seats said valve. For operating the valve 19, I prefer to employ a bell crank 7 which will in most cases be adjustably connected to the stem by means of nuts or the like 20. A rod or the like 1, leading to a point within reach of the driver, or to any other preferred point, is provided for operating the bell crank 7 to control the valve 19.

A one-way connection 3, preferably of linked formation, is provided between the two bell cranks 6 and 7 and it will thus be seen that when rod 2 is operated to open the valve 9 the lever 7 will be simultaneously moved to open the valve 19. This simultaneously admits a quantity of the priming liquid and sufficient fresh air to insure easy starting, it being well known that the foul air in the engine cylinders will not mix with the fuel and form as easily a combustible mixture, as quickly as fresh air. After the motor has started, the rod 2 is released to allow the spring 4 to close the valve 9, but if desired, the valve 19 may remain open to admit fresh air to the engine cylinders. This is of particular advantage in wet weather, but at other times it is also advisable to allow an auxiliary quantity of fresh air to enter.

As above suggested, the receptacle 11 may be filled with any adequate priming liquid and for illustrative purposes, I have shown a screw plug 23 in the top 25 for filling said receptacle.

The operating rods 1 and 2 are preferably extended up through the dash-board of the automobile, the rod 2 being provided with a knob 39 while the rod 1 is connected to a bell crank lever 33 secured at 34 to a plate 32 which is mounted on the board 38 by means of screws or the like 35, said bell crank having a combined operating knob and indicator 37 for coöperation with the gage or graduated dial 36.

The operator having found through experience, the point at which the valve 19 must be adjusted for efficient operation, and said point being indicated on the graduated dial, can set the indicator at the proper point, for best results.

From the foregoing, taken in connection with the accompanying drawing, it will be seen that although my invention is of simple and inexpensive nature, it will be highly efficient and in every way desirable, and since probably the best results may be obtained from the details disclosed, they may well be followed. However, it is to be understood that the present disclosure shows only one manner in which the device may be constructed as evidenced by the scope of the invention claimed.

I claim:

1. In a priming device for internal combustion engines, a receptacle for the priming liquid having an outlet in its bottom, a valve for controlling the discharge of the priming liquid from said receptacle into said outlet, an air supply passage leading to said outlet from the atmosphere, a valve for controlling the entrance of air through said passage, and means for opening the two valves simultaneously from a single hand control or for opening the air controlling valve independently of the other.

2. In a priming device for internal combustion engines, a receptacle for the priming liquid having an outlet in its bottom, a valve for controlling the discharge of the priming liquid from said receptacle into said outlet, an air supply passage leading to said outlet from the atmosphere, a valve for controlling the entrance of air through said passage, levers fulcrumed on said receptacle and connected respectively with the two valves, independent hand controls for said levers, and a one-way connection for operating the lever of the air controlling valve from the other lever.

3. In a priming device for internal combustion engines, a receptacle for the priming liquid, said receptacle having a removable top provided with a lateral, apertured ear, an outlet nipple depending from the lower end of said receptacle for communication with the intake manifold of the engine, a valve for controlling the discharge of liquid through said nipple, and an L-shaped air supply tube on the exterior of said receptacle having its lower end threaded in and communicating with said nipple and having its upper end held by said apertured ear.

4. In a priming device for internal combustion engines, a receptacle for the priming liquid having an outlet in its lower end, and a valve stem whose lower end normally closes said outlet and whose upper end slides through the top of the receptacle, said stem having a port to admit air to the upper end of the receptacle when said stem is moved to unseat its valve.

In testimony whereof I have hereunto set my hand.

CARL G. FREDRICKSON.